(12) United States Patent
Dewey et al.

(10) Patent No.: US 8,504,533 B2
(45) Date of Patent: Aug. 6, 2013

(54) DE-DUPLICATION REFERENCE TAG RECONCILIATION

(76) Inventors: Matthew Dewey, Broomfield, CO (US); Roderick B. Wideman, Shakopee, MN (US)

( * ) Notice: Subject to any disclaimer, the term of this patent is extended or adjusted under 35 U.S.C. 154(b) by 0 days.

(21) Appl. No.: 13/332,038

(22) Filed: Dec. 20, 2011

(65) Prior Publication Data

US 2013/0159261 A1   Jun. 20, 2013

(51) Int. Cl.
*G06F 17/00* (2006.01)
*G06F 17/30* (2006.01)

(52) U.S. Cl.
CPC .............. *G06F 17/30156* (2013.01)
USPC .......................... 707/692; 707/698

(58) Field of Classification Search
CPC ................................ G06F 17/30156
USPC ................................ 707/692, 698
See application file for complete search history.

(56) References Cited

U.S. PATENT DOCUMENTS

| | | | |
|---|---|---|---|
| 7,504,969 B2 * | 3/2009 | Patterson et al. | 341/51 |
| 2011/0004639 A1 * | 1/2011 | Williams | 707/812 |
| 2011/0191305 A1 * | 8/2011 | Nakamura et al. | 707/692 |
| 2011/0231362 A1 * | 9/2011 | Attarde et al. | 707/609 |
| 2011/0307447 A1 * | 12/2011 | Sabaa et al. | 707/637 |
| 2012/0054197 A1 * | 3/2012 | San Martin et al. | 707/747 |

* cited by examiner

*Primary Examiner* — Miranda Le

(57) ABSTRACT

Example apparatus and methods concern de-duplication reference tag reconciliation associated with garbage collection and/or reference health checking. One example method may include accessing data associated with members of a set of references to blocks of data stored by a data de-duplication system. The method may process the first data to manipulate a Bloom filter into a state from which membership in the set of references can be assessed. The method may also include accessing a block identifier identified with a member of the set of blocks of data stored by the data de-duplication system and assessing membership in the set of references for the block identifier by querying the Bloom filter with the block identifier. If the block is not referenced, as determined by querying the Bloom filter, then the method may include performing a block reclamation action on the unreferenced block.

16 Claims, 3 Drawing Sheets

DE-DUPLICATION REFERENCE TAG RECONCILIATION

BACKGROUND

Data de-duplication (dedupe) systems can experience situations where a unique block of data that was stored is no longer needed because no entity is referencing that unique block of data. The referencing entity (e.g., file, object) may, for example, have been deleted. Dedupe systems can also experience situations where a reference to a block of unique data that should be present in a set of stored unique data can go unsatisfied because the block of unique data is no longer available. The block may, for example, have been damaged or inadvertently deleted. The first situation results in wasted memory. Conventional garbage collection systems may be employed to reclaim this memory. The second situation results in potentially corrupted files and file read failures. Conventional reference checkers may be employed to locate, report on, and/or repair unresolved references.

Unfortunately, conventional garbage collection systems and conventional reference checkers may consume unacceptable amounts of memory and/or time to perform their functions. Unacceptable time and/or memory may be consumed because conventional systems and methods may do list-to-list comparisons after building and sorting lists. Lists may be created in memory to prevent disk i/o for each lookup of an item on the list. For example, a conventional garbage collection system may acquire a list of all the blocks of data stored by the dedupe system and may also acquire a list of all the blocks of data referenced by a referencing system (e.g., file system). Comparing unsorted lists may be computationally unfeasible. Therefore, conventional garbage collection systems may sort these lists so that list-to-list comparisons can be performed in a relevant timeframe. Similarly, conventional reference health checkers may acquire a list of all the blocks of data stored by the dedupe system and may also acquire a list of all the blocks of data referenced by a referencing system (e.g., file system). Conventional reference health checkers may then sort these lists so that list-to-list comparisons can be performed in a relevant timeframe.

In a dedupe system, data is processed to identify and store the unique data present in a source (e.g., file, data stream). Redundant occurrences of data may be replaced with references to a single stored copy of the unique data. When the references are smaller than the unique data, then savings in storage space may be achieved. When the references are substantially smaller than the unique data blocks, and when there are multiple references to a unique data block, then significant savings in storage space may be achieved.

However, as dedupe systems are used, some of the unique data may no longer be needed. For example, the last file that references a piece of unique data may be removed from a referencing source (e.g., file system) and thus the piece of unique data may no longer be needed. Undesirably, the piece of unique data may remain in the data store where unique data is stored, even though it is unreferenced. This is undesirable because unused data is consuming storage space that could be used for other unique data that is actually referenced. Conventional garbage collection systems may attempt to reclaim the space associated with the unreferenced unique data. To reclaim this space, the unreferenced unique data must first be identified. In one example, a list of all references is compared to a list of all unique data. Unique data for which there is no reference may be deleted. While conceptually simple, this task may be resource and/or computationally complex.

In one example dedupe system, unique pieces of data may be referred to as blocks. In this example, a block pool may store unique blocks that may be individually accessible. A block may be assigned a unique identifier (e.g., a block tag). The block pool may maintain a list of unique blocks. In another example dedupe system, although files or data streams may ultimately be subdivided into blocks, files or data streams may first be subdivided into binary large objects (BLOB). A BLOB may then be subdivided into a number of blocks. BLOBs may be employed to refer to sets of blocks because the number of blocks may become too large to track individually in a practical manner. In this example, blocks may not be stored individually but may be stored along with other blocks found in the same BLOB. A BLOB may be assigned a unique identifier (e.g., a BLOB tag). A BLOB may include a list of blocks stored in the BLOB. In this example, while a block pool may store blocks, it actually stores BLOBS in which blocks are stored. In the first example, a list of unique blocks may be directly available. In the second example, a list of BLOBs may be directly available and a list of unique blocks may be accessible through the list of BLOBs.

Conventional garbage collection processing may compare the entire list of blocks associated with a storing entity (e.g., block pool) to the entire list of block tags referenced by a referencing entity (e.g., file system). Conventional garbage collection processing may, additionally or alternatively, compare the entire list of BLOB tags associated with a storing entity (e.g., BLOB pool, block pool) to the entire list of BLOB tags referenced by a referencing entity (e.g., file system). BLOBs for which there are no references may be reclaimed. At a finer granularity, blocks for which there are no references may be reclaimed. References that cannot be satisfied may trigger error processing including, for example, reporting an error and/or attempting to correct the error.

Conventional systems may perform either garbage collection or reference checking using list to list comparisons. Consider a list of referencing entities associated with a file system. This list may include hundreds of millions ($1 \times 10^8$) entries. Let $\alpha$=the number of entries in the referencing list. Consider also a list of referenced items. In a large enterprise, this may include hundreds of millions ($1 \times 10^8$) of items. Let $\beta$=the number of referenced entities. Thus, when the lists are unsorted, finding any given entry from the reference list in the referenced items list would consume $O(\beta/2)$ time. This comparison would need to be performed a times. $O(\alpha * \beta/2)$ may be an unacceptable amount of time.

Therefore, conventional garbage collection or reference checking systems and methods typically sort the lists before performing the comparisons. In one example, the amount of time required to sort the two lists would be $O(\alpha \log \alpha) + O(\beta \log \beta)$. While sorting the lists reduces the amount of time required to compare the lists (e.g., $(O(\alpha \log \alpha) + O(\beta \log \beta)) << (\alpha * O(\beta/2))$) sorting the lists may produce an additional issue of unacceptable or undesirable memory usage.

For garbage collection and/or reference health checking, the size of the referencing information to be sorted and the size of the block information to be sorted may produce both complexity and memory issues. However, in practice, memory issues tend to be larger concerns. When the amount of memory available for sorting is less than the amount of memory required to hold the entire set of data to be sorted, then sorting may experience i/o slowdowns due, for example, to disk i/o.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
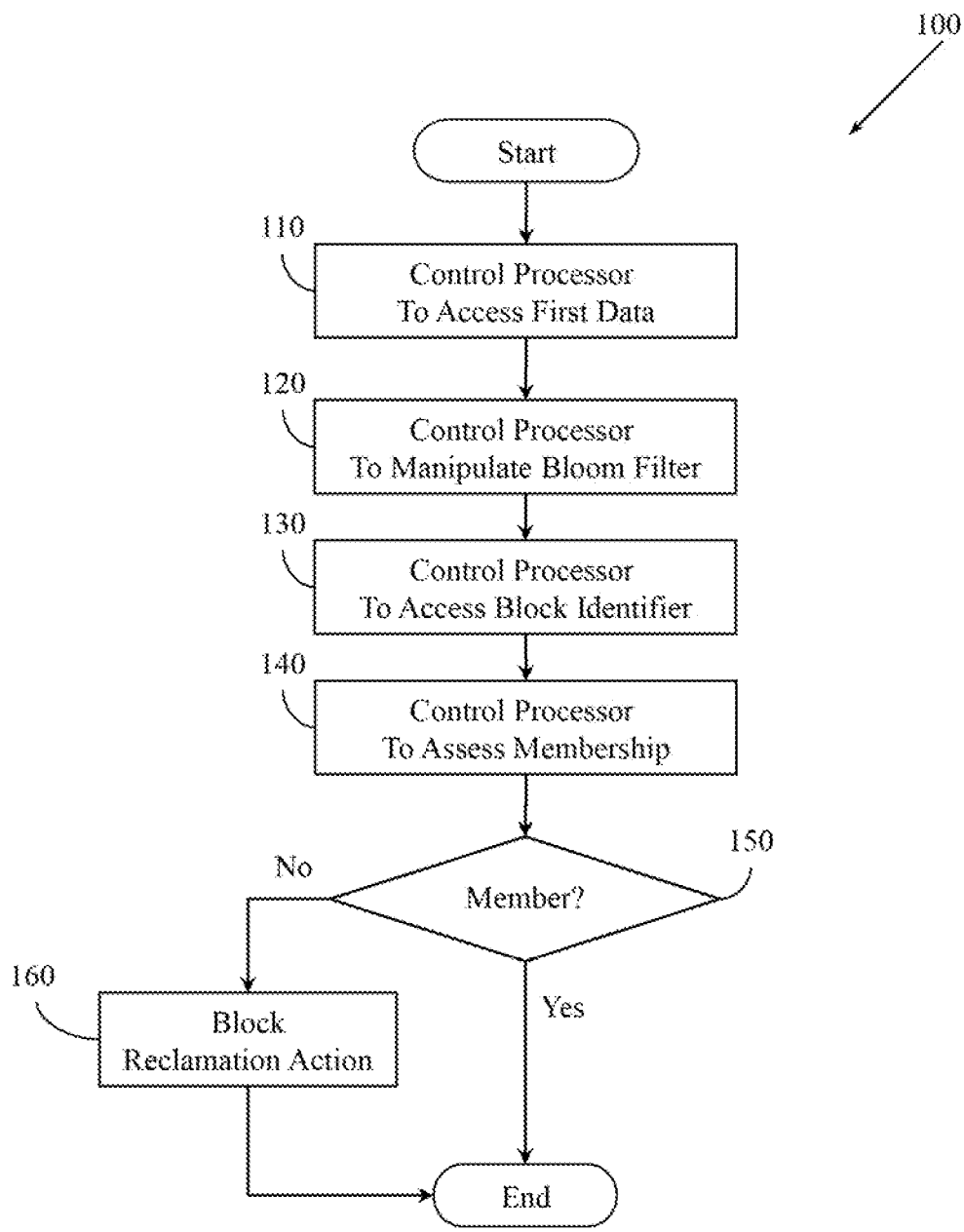
FIG. 1 illustrates a method associated with de-duplication reference tag reconciliation.

Example apparatus and methods replace sorted list to sorted list comparison in de-duplication garbage collection and reference checking with list to filter comparison or, more generally, replace list to list comparison with information to filter comparison. Thus, example systems and methods facilitate performing garbage collection and/or reference checking in dedupe systems using substantially less memory than conventional systems. Example methods do not compare a referencing list to a storage list directly but rather compare either individual pieces of information that may have been organized in a list to a Bloom filter that was populated by information that may also have come from a list. In one example, a block or a block list may be compared to a reference entity filter while in another example a reference or a referencing entity list may be compared to a block filter.

While the Bloom filter may not provide exact correctness concerning inclusion in a set and thus may incorrectly report that an entry is a member of a set, the Bloom filter will correctly report that an item is not a member of the set represented by the Bloom filter. Example systems and methods trade exact correctness against memory usage and the time to produce improvements over conventional systems. Also, the existence of a false positive is not fatal to either garbage collection or reference health checking because a false positive may only have a benign effect like leaving a present but unused block in memory. In one example, to reduce pathological cases where some entries produce an unacceptable number of false positives, data stored in and presented to a Bloom filter may be modulated in different ways at different times to reduce the likelihood of pathological behavior. The modulation may cause filters that are created at different points in time to use different parameters so that they create disjoint sets of false positives. This may result in an overall lower false positive rate than a single filter parameter set would achieve in the same memory footprint.

In one example, information associated with entries in a block pool is used to populate a Bloom filter(s). Information associated with referencing entities can then be presented to the Bloom filter to determine whether the referencing entity has a corresponding entry in the set represented by the data stored in the Bloom filter. If there is no entry, then the reference cannot be satisfied because the reference refers to an element that is not present in the set of stored blocks. In another example, information associated with referencing entities can be used to populate a Bloom filter(s). Information associated with an entry in a block pool can then be presented to the Bloom filter to determine whether there is a reference corresponding to the block. If there is no reference, then the block is not referenced and may be available for reclamation. If there is no reference in the Bloom filter, then the block is not a member of the set of things for which there are references. This means the block is not referenced.

In one example, the information associated with entries in a block pool may be acquired from a block list, from a BLOB list, from a set of representations of BLOBs, from a set of representations of files, from a block pool map, or from another item. In one example, information associated with referencing entities may be acquired from a file system, from a reference list, from an object list, from a set of representations of files, from a set of representations of objects, or from another item.

In one example, when a Bloom filter holds information about a set of references, information about stored blocks can be analyzed by querying the Bloom filter to determine whether the block is unreferenced and thus available for consideration for reclamation. In another example, when a Bloom filter holds information about a set of blocks, information about references can be analyzed by querying the Bloom filter to determine whether the reference can be satisfied from the set of blocks or whether the reference can be considered for being subjected to remedial action.

A Bloom filter is a space-efficient probabilistic data structure that can be used to test for set membership. While false positives are possible, false negatives are not. Thus, a query to a Bloom filter may report either that an element is "certainly not a member of the set" or that an element "probably is in the set". An element is added to a Bloom filter by feeding the element to be added to each of k (k being an integer) hash functions to identify k array positions in the filter where bits will be set. A query for an element is performed by feeding the element to be queried for to each of the k hash functions to identify k array positions in the filter to examine. If any of the k bit positions are 0, then the element is certainly not in the set whose membership is modeled by the Bloom filter. If all of the k bit positions are 1, then the element is likely a member of the set, but that is not guaranteed. Different Bloom filters may have different numbers k of hashes.

A Bloom filter with a 1% false positive error rate and an optimal value of k requires about 9.6 bits per element, regardless of the size of the elements. A 0.1% error rate can be achieved using about 14.4 bits per element. Additional improvements can be achieved with additional bits and additional numbers of hashes. In one example, the amount of memory consumed by a Bloom filter that will hold set membership information for a set of blocks, where the set is of size $\alpha$, would be $14.4\alpha$ bits, which is considerably smaller than the amount of memory consumed when using some sorts to sort a list of size $\alpha$. Also, creating the Bloom filter will only take on the order of $O(k\alpha)$ time.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

FIG. 1 illustrates a method 100 for determining whether a block is referenced from a referencing entity. Method 100 includes, at 110, controlling a processor to access first data. The first data may be associated with members of a set of references to members of a set of blocks of data stored by a data de-duplication system in a block pool. The references may be associated with, for example, a file, a file system, or other referencing entity. The references may be acquired, for example, from representations of files in the file system, from representations of objects in the file system, from representations of BLOBs associated with the file system, and from other locations. In one example, the first data is a list of references to blocks stored in the block pool for a file system for which the de-duplication system performs data de-duplication. In another example, the first data is a list of reference BLOBs stored in the block pool.

Method 100 also includes, at 120, controlling the processor to process the first data to manipulate a Bloom filter into a state from which membership in the set of references can be assessed. Manipulating the Bloom filter may include populating the Bloom filter by manipulating bits at locations identified by passing members of the first data through k hash functions, k being an integer. In one example, the Bloom filter may be manipulated to a state where it will produce less than a 1% false positive rate for set membership. In another example, the Bloom filter may be manipulated to a state where it will produce less than a 0.1% false positive rate for set membership. One skilled in the art will appreciate that different embodiments may seek higher or lower false positive rates and thus may manipulate different Bloom filters differently.

Method 100 also includes, at 130, controlling the processor to access a block identifier identified with a member of the set of blocks of data stored by the data de-duplication system. The block identifier may be acquired, for example, from a block list associated with the block pool, from a BLOB list associated with the block pool, and from other locations. The block identifier may identify, for example, a block of unique data stored in the block pool.

Method 100 also includes, at 140, controlling the processor to assess membership in the set of references for the block identifier by querying the Bloom filter with the block identifier. Querying the Bloom filter may include passing the block identifier through the same k hash functions used to populate the Bloom filter and then analyzing the values of bits found at the locations identified using the k hash functions. The assessment will indicate that the block identifier has a corresponding member in the set of references and thus is still referenced or will indicate that the block identifier does not have a corresponding member in the set of references and thus is not referenced.

At 150 a decision is made based on the assessment performed at 140. If the decision at 150 is yes, that the block identifier has a corresponding member in the set of references, then the block identifier is likely still referenced and will be left alone. If the decision at 150 is no, that the block identifier does not have a corresponding member in the set of references, then the block associated with the block identifier is not still referenced and method 100 will proceed, at 160, to control the processor to selectively perform a block reclamation action. The block reclamation action is performed upon determining that the Bloom filter indicates that there is no member of the set of references associated with the block identifier. The block reclamation action may include, for example, generating an error signal, flagging the block for deletion, deleting the unreferenced block, reclaiming the memory allocated for the unreferenced block, updating reference counts for the block, and other actions. While method 100 illustrates processing a single block identifier, method 100 may be repeated for a greater number of block identifiers.

In one example, controlling the processor at 120 may include determining whether to modulate. Modulating facilitates dealing with potentially pathological edge cases where certain block identifiers may repeatedly produce false positives.

Method 100 may decide to modulate based on different criteria. For example, method 100 may decide to modulate based on the Bloom filter having been used for a threshold period of time, on the Bloom filter having been queried a threshold number of times, on the Bloom filter having produced a threshold number of false positives, and other reasons. Modulating may include modulating both the data that is stored in the Bloom filter and the data that is used to query the Bloom filter.

Performing modulation may include, for example, XOR-ing data, inverting bits in a data, adding or subtracting values from data, changing the k hash functions to different (e.g., k') hash functions, and other actions. In different embodiments, changing the hash functions may include changing the number of hash functions, changing the hashing algorithm, or both. The modulation is performed to produce different instances of filters at different points in time that use different parameters or hash functions to create at least partially disjoint sets of false positives. This facilitates producing an overall lower false positive rate than using a single instance of a filter.

While FIG. 1 illustrates various actions occurring in serial, it is to be appreciated that various actions illustrated in FIG. 1 could occur substantially in parallel. By way of illustration, a first process could access first data and manipulate a Bloom filter and a second process could assess membership. While two processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform methods described herein including method 100 and method 200. While executable instructions associated with the listed methods are described as being stored on a computer-readable medium, it is to be appreciated that executable instructions associated with other example methods described herein may also be stored on a computer-readable medium.

Figure 2:
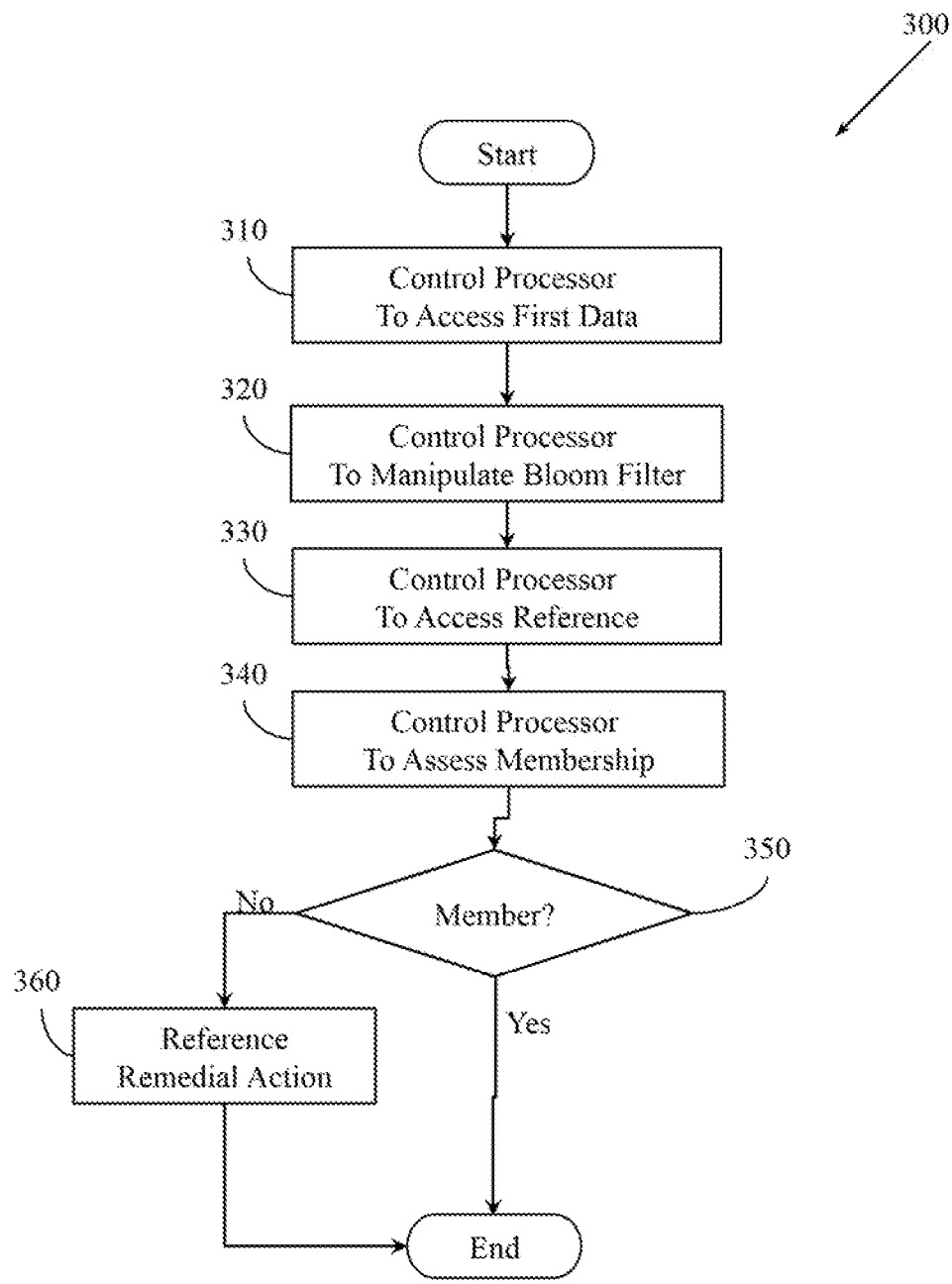
FIG. 2 illustrates a method associated with de-duplication reference tag reconciliation.
Figure 3:
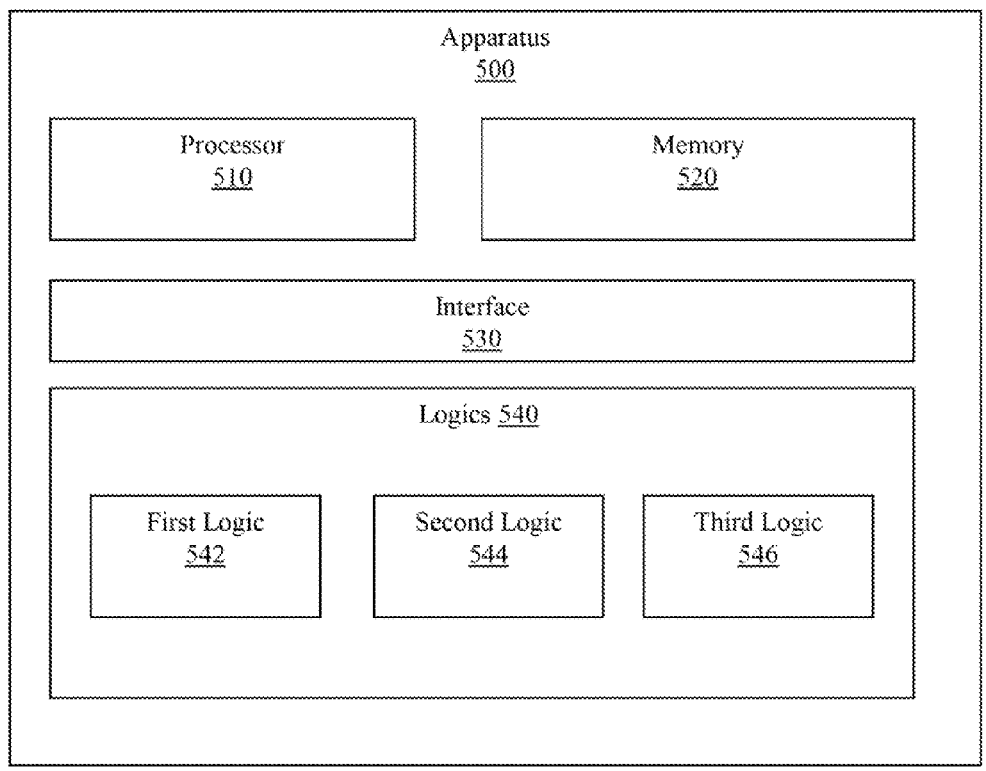
FIG. 3 illustrates an apparatus for determining set membership in a data de-duplication system.

FIG. 2 illustrates a method 300 for determining whether a reference can be satisfied from a block pool. Method 300 includes, at 310, controlling a processor to access first data associated with members of a set of blocks of data. The set of blocks of data are stored by a data de-duplication system. In one example, the first data is a list of blocks of data in the set of stored blocks of data stored in a block pool associated with the data de-duplication system. While a list of blocks is described, other collections of information may be accessed. For example, a list of BLOBs may be accessed.

Method 300 also includes, at 320, controlling the processor to process the first data to manipulate a Bloom filter into a state from which membership in the set of blocks of data can be assessed. In different examples the Bloom filter may be manipulated to different states including, for example, a state where the first Bloom filter will produce less than a 1% false positive rate for set membership, or a state where the first Bloom filter will produce less than a 0.1% false positive rate for set membership. At different points in time, the Bloom filter may be manipulated using either a modulated approach or an un-modulated approach. Modulation may be employed to mitigate issues associated with false positives. In one example, a decision may be made concerning whether to use a modulated approach or an un-modulated approach. The decision may be based, for example, on the amount of time an approach has been used, the number of times a filter has been queried, the number of times a filter has produced a false positive, or other reasons. In one embodiment, modulating may include manipulating the data that is stored in the filter and the data that is presented to the filter. In another embodiment, modulating may include changing the set of k hashes that are used in association with the filter to a different (e.g., k') set of hashes. In different embodiments, either a different number of hashes or different hash functions may be used.

Method 300 also includes, at 330, controlling the processor to access a reference to a block stored by the data de-duplication system. The reference is associated with a referencing entity for which the data de-duplication system stores blocks of data. The referencing entity may be, for example, a file, a file system, an object, an object system, and other referencing entities. In one example, the reference to the block of data is associated with a file system for which the data de-duplication system stores de-duplicated data. While a reference to a block is described, in one example, a reference to a BLOB may be accessed.

Method 300 also includes, at 340, controlling the processor to assess membership in the set of stored blocks of data for the reference to the block. Assessing membership in the set includes querying the Bloom filter with the reference to the block. While the Bloom filter may return a false positive, it will return accurate information about non-membership. In one example, method 300 may include controlling the processor to assess membership in a set of stored BLOBs for a reference to a BLOB.

If the determination at 340 is yes, then method 300 may conclude. But if the determination at 340 is no, that there is no member of the set of stored blocks of data that corresponds to the reference, then method 300 may proceed, at 350, to control the processor to perform a remedial reference action. The remedial reference action may be performed upon determining that the Bloom filter indicates that there is no member of the set of stored blocks of data associated with the reference to the block.

FIG. 5 illustrates an apparatus 500 for determining set membership in a data de-duplication system. Apparatus 500 includes a processor 510, a memory 520, a set 540 of logics, and an interface 530 to connect the processor 510, the memory 520, and the set 540 of logics. In one embodiment, apparatus 500 may be a special purpose computer that is created as a result of programming a general purpose computer. In another embodiment, apparatus 500 may include special purpose circuits that are added to a general purpose computer to produce a special purpose computer.

In one embodiment, the set 540 of logics includes a first logic 542, a second logic 544, and a third logic 546. In one embodiment, the first logic 542 is configured to populate a Bloom filter with first information concerning a first set. In one embodiment, the first set is a set of blocks stored in a block pool associated with a de-duplication system and the second set is a set of references to blocks referenced by a referencing entity. The referencing entity may be, for example, a file, a file system, an object system, and so on.

The block pool is configured to store blocks associated with the referencing entity. In another embodiment, the first set is a set of references to blocks referenced by a referencing entity and the second set is a set of blocks stored in a block pool associated with a de-duplication system.

In one embodiment, the second logic 544 is configured to query the Bloom filter with an entry from a second set to determine whether the Bloom filter indicates that the entry from the second set has a corresponding member in the first set. In different embodiments the referenced entities may be blocks and/or BLOBs.

In one embodiment, the third logic 546 is configured to control a processor to take an action as a function of the second logic 544 determining that the Bloom filter indicates that the entry from the second set does not have a corresponding member in the first set. In one embodiment, the action is a reference remediation action. In another embodiment, the action is a space reclamation action. The reference remediation action and/or the space reclamation action are instances of de-duplication reference tag reconciliation.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

While example apparatus, methods, and computer-readable media have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A method for performing maintenance on a block pool and an index produced by a deduplication system, comprising:
    controlling a processor to access first data associated with members of a set of references to members of a set of blocks of data stored by a data de-duplication system in a block pool;
    controlling the processor to process the first data to manipulate a Bloom filter into a state from which membership in the set of references can be assessed, wherein processing the first data to manipulate the Bloom filter comprises using a first set of hashes, wherein the first data is one of, a list of references to blocks stored in the block pool, a list of references to BLOBs stored in the block pool;
    controlling the processor to access a block identifier identified with a member of the set of blocks of data stored by the data de-duplication system;
    controlling the processor to assess membership in the set of references for the block identifier by querying the Bloom filter with the block identifier, wherein querying the Bloom filter with the block identifier includes processing the block identifier using the first set of hashes; and
    controlling the processor to selectively perform a block reclamation action upon determining that the Bloom filter indicates that there is no member of the set of references associated with the block identifier, wherein the reclamation action comprises deleting the block from the block pool and reclaiming storage in the block pool associated with the block.

2. The method of claim 1, the list of references being associated with a file system for which the de-duplication system stores de-duplicated data.

3. The method of claim 1, comprising:
    controlling the processor to modulate the first data and the block identifier in a manner sufficient to change the false positive response of the Bloom filter with respect to at least one query.

4. The method of claim 3, wherein modulating the first data and the block identifier includes manipulating the first data into a second, different data and manipulating the block identifier into a second, different identifier.

5. The method of claim 3, comprising determining to modulate the first data and the block identifier as a function of one or more of, a length of time the Bloom filter has been in use, a number of queries presented to the Bloom filter, and a number of false positives produced by the Bloom filter.

6. The method of claim 1, comprising selectively controlling the processor to change from processing the first data to manipulate the Bloom filter using a first set of hashes to processing the first data to manipulate the Bloom filter using a second, different set of hashes, and controlling the processor to change from querying the Bloom filter with the block identifier after processing the block identifier using the first set of hashes to querying the Bloom filter with the block identifier after processing the block identifier using the second, different set of hashes.

7. A non-transitory computer-readable medium storing computer-executable instructions that when executed by a computer control the computer to perform a method for performing maintenance on a block pool and an index produced by a deduplication system, the method comprising:
    controlling a processor to access first data associated with members of a set of blocks of data stored by a data de-duplication system;
    controlling the processor to process the first data to manipulate a Bloom filter into a state from which membership in the set of blocks of data can be assessed, wherein processing the first data to manipulate the Bloom filter comprises using a second set of hashes, wherein the first data is one of, a list of references to blocks stored in the block pool, a list of references to BLOBs stored in the block pool;
    controlling the processor to access a reference to a block stored by the data de-duplication system, the reference being associated with a referencing entity for which the data de-duplication system stores blocks of data;

controlling the processor to assess membership in the set of stored blocks of data for the reference to the block by querying the Bloom filter with the reference to the block, wherein querying the Bloom filter with the block identifier includes processing the block identifier using the second set of hashes; and controlling the processor to perform a remedial reference action upon determining that the Bloom filter indicates that there is no member of the set of stored blocks of data associated with the reference to the block.

8. The non-transitory computer-readable medium of claim 7, wherein the first data is one of, a list of blocks of data in the set of stored blocks of data stored in a block pool associated with the data de-duplication system, and a list of BLOBs stored in the block pool.

9. The non-transitory computer-readable medium of claim 7, wherein the reference to the block of data is associated with a file system for which the data de-duplication system stores de-duplicated data.

10. The non-transitory computer-readable medium of claim 7, the method comprising performing one of:

manipulating the first Bloom filter to a state wherein the first Bloom filter will produce less than a 1% false positive rate for set membership; and manipulating the first Bloom filter to a state wherein the first Bloom filter will produce less than a 0.1% false positive rate for set membership.

11. The non-transitory computer-readable medium of claim 7, the method comprising selectively modulating the first data and the reference.

12. The non-transitory computer-readable medium of claim 11, wherein modulating the first data comprises performing a data altering operation on the first data and wherein modulating the reference comprises performing a data altering operation on the reference.

13. The non-transitory computer-readable medium of claim 7, wherein modulating the first data and the reference comprises changing a set of hashes used to process data that populates the Bloom filter and to process data that queries the Bloom filter.

14. An apparatus for performing maintenance on a block pool and an index produced by a deduplication system, comprising:

a processor;

a memory;

a set of logics; and an interface to connect the processor, the memory, and the set of logics, the set of logics comprising:

a first logic configured to populate a Bloom filter with first information concerning a first set, wherein the first information comprises a first set of hashes;

a second logic configured to query the Bloom filter with an entry from a second set, wherein the second set of information comprises a second set of hashes; and a third logic configured to control a processor to take an action as a function of the second logic determining that the Bloom filter indicates that the entry from the second set does not have a corresponding member in the first set, wherein the action is associated with de-duplication reference tag reconciliation, wherein the first set being a set of references to blocks referenced by a referencing entity, the second set being a set of blocks stored in a block pool associated with a de-duplication system, and the action being a space reclamation action.

15. The apparatus of claim 14, the first set being a set of blocks stored in a block pool associated with a de-duplication system, the second set being a set of references to blocks referenced by a referencing entity, wherein the block pool stores blocks associated with the referencing entity.

16. The apparatus of claim 15, the referencing entity being a file system and the action being a reference remediation action.

* * * * *

UNITED STATES PATENT AND TRADEMARK OFFICE
CERTIFICATE OF CORRECTION

| | |
|---|---|
| PATENT NO. | : 8,504,533 B2 |
| APPLICATION NO. | : 13/332038 |
| DATED | : August 6, 2013 |
| INVENTOR(S) | : Dewey et al. |

It is certified that error appears in the above-identified patent and that said Letters Patent is hereby corrected as shown below:

In the Specification

Detailed Description of Invention:

In column 2, line 44, delete "performed a times" and insert --performed α times--.

Signed and Sealed this
Twenty-second Day of October, 2013

Teresa Stanek Rea
*Deputy Director of the United States Patent and Trademark Office*